(12) United States Patent
Johnson et al.

(10) Patent No.: US 6,622,185 B1
(45) Date of Patent: Sep. 16, 2003

(54) SYSTEM AND METHOD FOR PROVIDING A REAL-TIME PROGRAMMABLE INTERFACE TO A GENERAL-PURPOSE NON-REAL-TIME COMPUTING SYSTEM

(75) Inventors: Peter J. Johnson, Reno, NV (US); Eric Bendall, Reno, NV (US)

(73) Assignee: Innovative Gaming Corporation of America, Las Vegas, NV (US)

( * ) Notice: Subject to any disclaimer, the term of this patent is extended or adjusted under 35 U.S.C. 154(b) by 0 days.

(21) Appl. No.: 09/395,647

(22) Filed: Sep. 14, 1999

(51) Int. Cl.[7] .............................................. G06F 13/24
(52) U.S. Cl. ..................... 710/48; 710/260; 463/42; 463/43
(58) Field of Search .................. 709/200; 710/19–26, 710/260, 263–264, 48; 711/104, 101, 103, 149, 156, 216; 712/160–161; 463/42, 43

(56) References Cited

U.S. PATENT DOCUMENTS

| | | | |
|---|---|---|---|
| 6,006,286 A | * 12/1999 | Baker et al. | 710/22 |
| 6,081,852 A | * 6/2000 | Baker | 710/24 |
| 6,333,938 B1 | * 12/2001 | Baker | 370/503 |
| 6,356,951 B1 | * 3/2002 | Gentry, Jr. | 709/250 |
| 6,389,468 B1 | * 5/2002 | Muller et al. | 709/226 |

OTHER PUBLICATIONS

"Storybook Fantasy—New Gaming Device Submittal and Compliance Report", *Innovative Gaming, Inc.*, 88 pgs. (Feb. 23, 1999).

* cited by examiner

*Primary Examiner*—S. Thomas Hughes
*Assistant Examiner*—Carmen D. White
(74) *Attorney, Agent, or Firm*—Merchant & Gould

(57) ABSTRACT

A system and method providing read-time external signals to and from a gaming application executing within a platform independent programming environment on a computing system. The system has an input packet queue located within a block of system RAM, a main processing module, and an intelligent I/O interface module all coupled to the main system bus. The system generates an input signal data packet in response to a change in state of one or more external signals. The intelligent I/O interface module itself includes a control processor, an plurality of external signal interfaces, and a dual-port RAM. The control processor generates and stores the input signal data packet within the dual-port RAM before asserting an interrupt signal to the main processing module. Finally, the interrupt signal causes the main processing module to transfer the input signal data packet from the dual-port RAM to the input packet queue. The main processing system retrieves the input signal data packets from the input queue by continually polling the queue and processing the packets in the order received.

7 Claims, 8 Drawing Sheets

SYSTEM AND METHOD FOR PROVIDING A REAL-TIME PROGRAMMABLE INTERFACE TO A GENERAL-PURPOSE NON-REAL-TIME COMPUTING SYSTEM

FIELD OF THE INVENTION

This invention relates in general to a system and method for providing a real-time programmable interface to a general-purpose non-real-time computing system. More particularly, this invention relates to a method and apparatus providing a real-time programmable interface to a general-purpose non-real-time computing system used to implement a gaming machine using a platform independent programming language that is capable of operating within a distributed computing environment.

BACKGROUND OF THE INVENTION

Computer-based gaming machines are becoming increasingly commonplace to construct gaming devices such as slot machines, video poker games, and video roulette wheels. These automated games utilize computing systems containing software modules to implement gaming logic. These computing systems also utilize computer video display devices and other computer controlled display devices to present gaming players with images of the various gaming apparatus being implemented.

These computer-based gaming systems replace mechanical systems such as slot machines comprising a plurality of rotating wheels and associated mechanical logic. The computing systems utilize a random number generator to determine a game outcome that statistically appears to be random in nature. The random numbers obtained from a random number-generating module are used to determine which symbols on the wheels of a slot machine are to be displayed when the game concludes a play. Similarly, these random numbers are used to shuffle standard decks of playing cards used in other games of chance.

These computer-based gaming machines also comprise software modules which when working together implement the rules of a particular game of chance. For a slot machine, these rules include the pay-out tables used to determine any winnings paid to a player for a particular combination of symbols shown on the rotating game wheels. Finally, the computer gaming machines comprise software modules which when working together display a series of images on the display device to simulate the appearance and operation of a gaming machine. These display modules typically comprise both video and audio output modules to provide a game player with a sensory experience comparable to the mechanical gaming machines.

Gaming machines that accept wagers and provide winning payouts are under a wide variety of regulatory oversight procedures and provisions from authorities of the various jurisdictions that permit the use of these devices. These oversight procedures and provisions are concerned in part with providing a level of assurance that the games operate in the manner advertised. The operation of the behavior of the random number generator, its relationship to the outcome of the game implemented, and the winning pay-out tables are part of the functions of these gaming devices which are inspected. The procedures for obtaining regulatory approval for each gaming device may be a long, complicated, and expensive undertaking on the part of the gaming machine manufacturer and its customers, gaming establishment operators.

At the same time, these computer controlled gaming machines are becoming based upon standard computing system components to reduce the cost of the development and deployment of these gaming machines. This reduction in cost occurs from the ability to develop multiple gaming machine implementations based upon a single gaming machine architecture. As part of the effort to allow the development of multiple gaming machine implementations based upon a single computer based gaming machine architecture, two additional inventions have been developed.

Typically, the gaming application modules have not been developed using a platform independent programming environment, high-level programming languages, and modern operating system that are needed to support both a rapid and efficient gaming application module development process as well as support game application execution within a distributed processing environment. This situation has caused each gaming application module to be a custom written programming module that does not typically contain a significant amount of reusable code that would permit a simple and easy modification of an existing game to support an new implementation. Part of the problems associated with the failure to use these more modern programming environments is the need to real-time or near-real-time response times to the occurrence of state changes on external signals representing inputs from gaming machine user interface module.

With the ability to more easily obtain approval for new gaming implementations and the ability to rapidly change from one game to another while meeting the demands of the gaming regulators, gaming establishments are provided with an improved ability to more readily change the gaming devices present in their establishments to satisfy the interests of their gaming players. The present invention provides a software architecture for implementing computer-based gaming machines to address the above problems in prior systems.

SUMMARY OF THE INVENTION

To overcome the limitations in the prior art described above, and to overcome other limitations that will become apparent upon reading and understanding the present specification, the present invention discloses a system and method for providing a real-time programmable interface to a general-purpose non-real-time computing system. The present invention solves the above-described problems by providing a method and apparatus providing a real-time programmable interface to a general-purpose non-real-time computing system used to implement a gaming machine using a platform independent programming language that is capable of operating within a distributed computing environment.

Other embodiments of a system in accordance with the principles of the invention may include alternative or optional additional aspects. One such aspect of the present invention is a method for providing read-time external signals to a platform independent programming environment executing upon a computing system. The computing system includes an input packet queue, an main processing module, and an intelligent I/O interface module. The intelligent I/O interface module has a control processor, an plurality of external signal interfaces, and a dual-port RAM. The method comprises detecting a change in state of at least one of the external signals by the control processor, generating a interface state packet containing representations of the current state of all external interface signals, storing the interface state packet within the dual-port RAM, asserting an interrupt signal from the control processor to the main processing module to indicate the presence of the interface state packet within the dual-port RAM; and receiving an acknowledgement signal asserted by the main processing module to indicate that the main processing module has transferred the interface state packet from the dual-port RAM to the input packet queue.

Another aspect of the present invention is a method for providing read-time external signals to a platform independent programming environment executing upon a computing system. The computing system includes an input packet queue, an main processing module, and an intelligent I/O interface module. The intelligent I/O interface module has a control processor, an plurality of external signal interfaces, and a dual-port RAM. The method comprises receiving an interrupt signal from the control processor by the main processing module to indicate the presence of the interface state packet within the dual-port RAM, transferring the interface state packet from the dual-port RAM to an input packet queue, and generating an acknowledgment signal asserted by the main processing module to the control processor to indicate that the main processing module has transferred the interface state packet from the dual-port RAM to the input packet queue Yet another aspect of the present invention is a method for providing read-time external signals from a platform independent programming environment executing upon a computing system. The computing system has an input packet queue, an main processing module, and an intelligent I/O interface module. The intelligent I/O interface module includes a control processor, an plurality of external signal interfaces, and a dual-port RAM. The method comprises receiving a output change in state command from the main processing module for least one of the external signals, decoding the output change in state command by the control processor, generating a change in state for at least one external output signal by the control processor, and transmitting an acknowledgement signal to the main processing module to indicate that output state in change command has been completed by the control processor.

Yet another aspect of the present invention is a method for providing real-time external signals from a platform independent programming environment executing upon a computing system. The computing system includes an input packet queue, a main processing module, and an intelligent I/O interface module. The intelligent I/O interface module has a control processor, an plurality of external signal interfaces, and a dual-port RAM. The method comprises generating a output change in state command by the main processing module for least one of the external signals and storing the output change in state command within the dual-port RAM, retrieving the output change in state command from the dual-port RAM and decoding the output change in state command by the control processor, generating a change in state for at least one external output signal by the control processor, and receiving an acknowledgement signal by the main processing module to indicate that output state in change command has been completed by the control processor.

Yet another aspect of the present invention is a method for providing real-time external signals to and from a gaming application executing within a platform independent programming environment on a computing system. The computing system having an input packet queue, an main processing module, and an intelligent I/O interface module. The intelligent I/O interface module having a control processor, an plurality of external signal interfaces, and a dual-port RAM. The method comprises detecting a change in state of at least one of the external signals by the control processor, generating a interface state packet containing representations of the current state of all external interface signals, storing the interface state packet within the dual-port RAM, asserting an interrupt signal from the control processor to the main processing module to indicate the presence of the interface state packet within the dual-port RAM. The method further comprises receiving an acknowledgement signal asserted by the main processing module to indicate that the main processing module has transferred the interface state packet from the dual-port RAM to the input packet queue, receiving a output change in state command from the main processing module for least one of the external signals, decoding the output change in state command by the control processor, generating a change in state for at least one external output signal by the control processor, and transmitting an acknowledgement signal to the main processing module to indicate that output state in change command has been completed by the control processor.

Yet another aspect of the present invention is a system for providing real-time external signals to and from a gaming application executing within a platform independent programming environment on a computing system. The system comprises an input packet queue located within a block of system RAM coupled to a main system bus, a main processing module coupled to the main system bus, and an intelligent I/O interface module coupled to the main system bus for generating an input signal data packet in response to a change in state of one or more external signals. The intelligent I/O interface module comprises a control processor, an plurality of external signal interfaces, and a dual-port RAM. The control processor generates and stores the input signal data packet within the dual-port RAM before asserting an interrupt signal to the main processing module. Finally, the interrupt signal causes the main processing module to transfer the input signal data packet from the dual-port RAM to the input packet queue.

Yet another aspect of the present invention is a apparatus for providing read-time external signals to and from a gaming application executing within a platform independent programming environment on a computing system. The computing system having an input packet queue, an main processing module, and an intelligent I/O interface module. The intelligent I/O interface module having a control processor, an plurality of external signal interfaces, and a dual-port RAM. The apparatus comprises means for detecting a change in state of at least one of the external signals by the control processor, means for generating a interface state packet containing representations of the current state of all external interface signals, means for storing the interface state packet within the dual-port RAM, means for asserting an interrupt signal from the control processor to the main processing module to indicate the presence of the interface state packet within the dual-port RAM, means for receiving an acknowledgment signal asserted by the main processing module to indicate that the main processing module has transferred the interface state packet from the dual-port RAM to the input packet queue, means for receiving a output change in state command from the main processing module for least one of the external signals, means for decoding the output change in state command by the control processor, means for generating a change in state for at least one external output signal by the control processor; and means for transmitting an acknowledgment signal to the main processing module to indicate that output state in change command has been completed by the control processor.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The embodiments of the invention described herein are implemented as logical operations in a telecommunications system having connections to a distributed network such as the Internet. The logical operations are implemented (1) as a sequence of computer implemented steps running on a computer system and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

The present invention provides a system and method for providing a real-time programmable interface to a general-purpose non-real-time computing system. In the preferred embodiment, the computing system is a computer controlled gaming machine in which the gaming machine modules are implemented using a platform independent programming language that is capable of operating within a distributed computing environment. One skilled in the art will recognize that the present invention may be used with any application module implemented using a platform independent programming language that is capable of operating within a distributed computing environment without deviating from the spirit and scope of the present invention.

Figure 1:
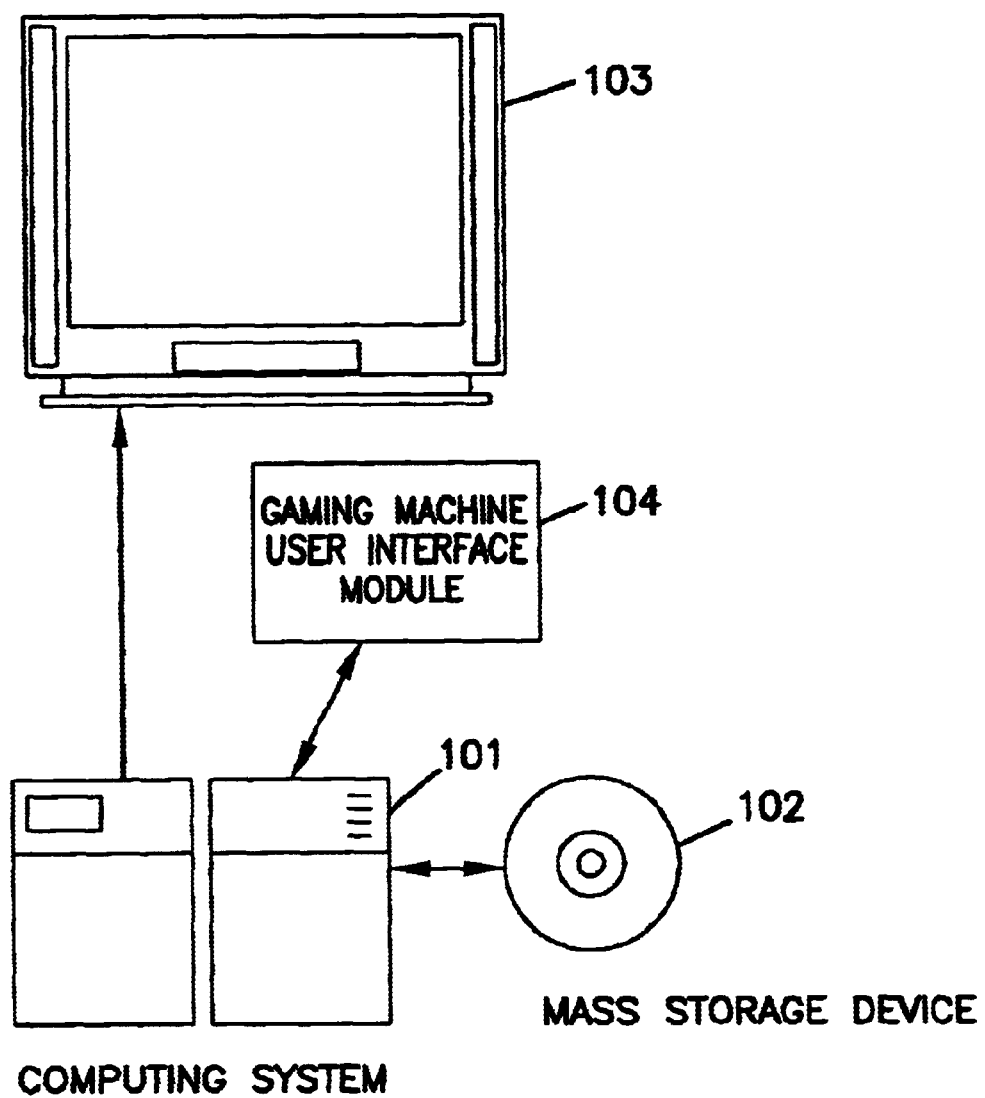
FIG. 1 illustrates a computing system according to one embodiment of the present invention.

FIG. 1 illustrates a computing system using a CD-ROM as a mass storage device according to one embodiment of the present invention. The present invention relates to a system and method for verifying the contents of a mass storage device 102 attached to a computing system 101 for use in storing application modules and data within a file system. The computing system 101 executes the application modules stored on the mass storage device 102 to generate images to be displayed on a display device 103.

Figure 2:
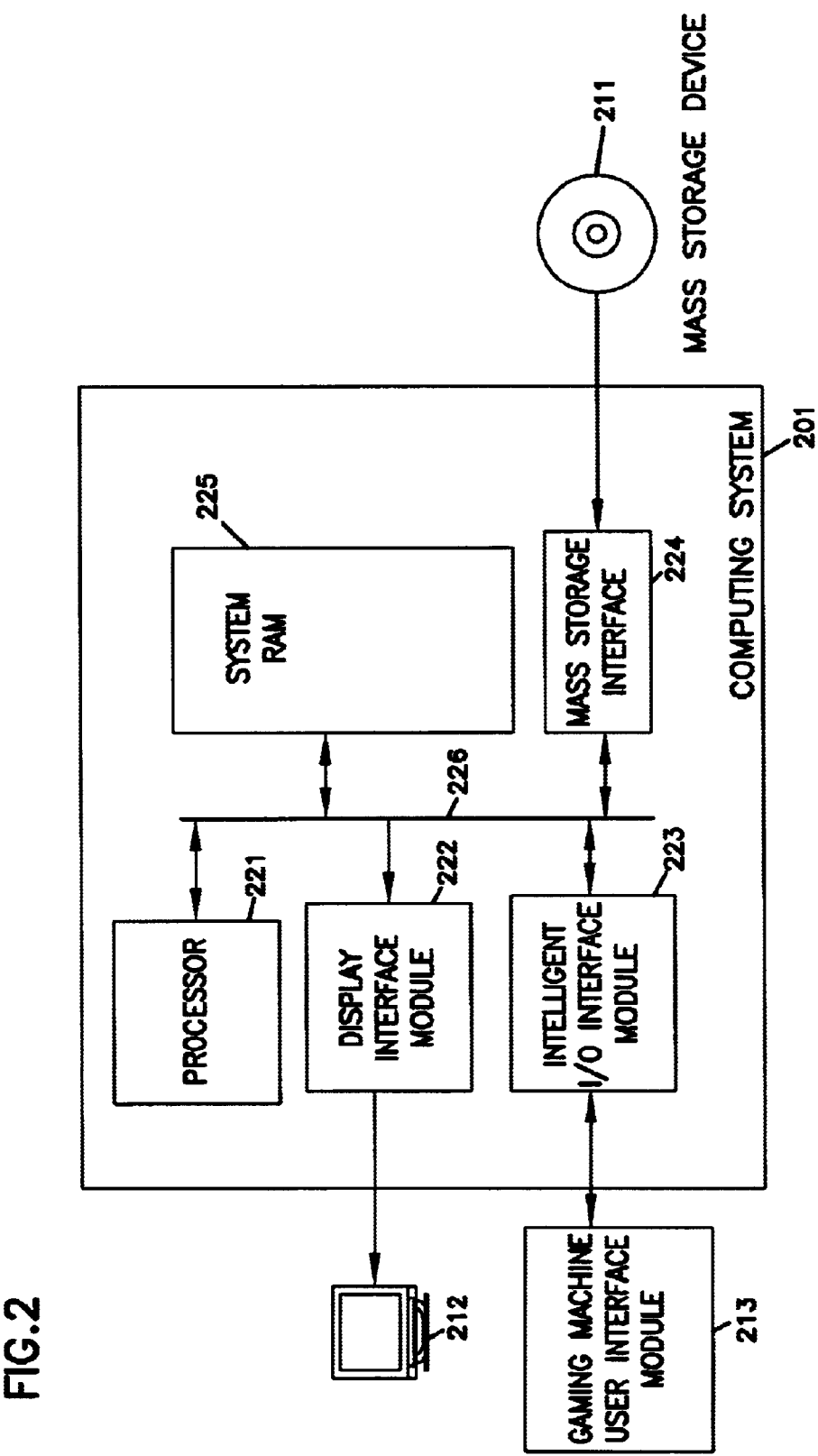
FIG. 2 illustrates a computing system used to implement a computer controlled gaming machine according to another embodiment of the present invention.

In the preferred embodiment, the computing system 101 is implemented using a computing system typically referred to as a personal computer as illustrated in FIG. 2. The computing system typically uses a PCI type system bus to implement the system communications bus 225. This choice to implement the preferred embodiment permits the main processing module 221, the display interface module 222, and the mass storage interface module 224 to be implemented with a wide variety of commonly available system components. This choice also permits the periodic improvement of the computing system 201 with the upgrade of one of these modules as new and faster computing modules become available. The preferred embodiment utilizes a main processing module 222 based upon a Pentium II processor manufactured by the Intel Corp. One of ordinary skill in the art will recognize that this processing unit may be based upon any number of alternate processing units manufactured by Advanced Micro Devices and other manufacturers as well as a PowerPC processor manufactured by IBM Corporation and Motorola.

The computing system 201 has a block of system random access memory (RAM) 225 for use in storing application modules and data for use when implementing a gaming machine. The computing system 201 has an intelligent input and output interface module (IIOB) 223 for interfacing the computing system 201 with a plurality of gaming machine interface devices 213 such as a hopper, bill acceptor, meters, input panels, and the like.

The technical description of these gaming machines may be found in detail in co-pending U.S. Patent Application, entitled, Method and Apparatus for Providing a Compartmentalized Game Instruction Architecture within a Gaming Machine, Ser. No. 09/396,190, filed Sep. 14, 1999, which is concurrently filed with the present application and is incorporated by reference in its entirety herein, and in co-pending U.S. Provisional Patent Application, entitled, System and Method for Distributing Casino Gaming. Employing Platform Independent Programming and Common Communication Protocols, Ser. No. 60/153,718, filed Sep. 19, 1999, which is also concurrently filed with the present application and is also incorporated by reference in its entirety herein.

The computing system 201 has a mass storage device 211 for storing a set of operating system modules, a set of gaming application modules and a set of corresponding gaming application data files for use by the computing system in implementing the gaming machine. The technical description of the CD-ROM based mass storage system may be found in detail in a co-pending U.S. Patent Application, entitled, System and Method for Verifying the Contents of a Mass Storage Device Before Granting Access to Computer Readable Data Stored on the Device, Ser. No. 09/396,821, filed Sep. 19, 1999, which is concurrently filed with the present application and is incorporated by reference in its entirety herein.

Additionally, the preferred embodiment of the computing system 201 utilizes a commercially available operating system, such as the Linux operating system available from RED HAT, INC. of Raleigh, N.C. The operating system is stored upon mass storage device 211 for execution with the main processing module to provide device driver support for the peripheral devices used to implement the system.

Figure 3:
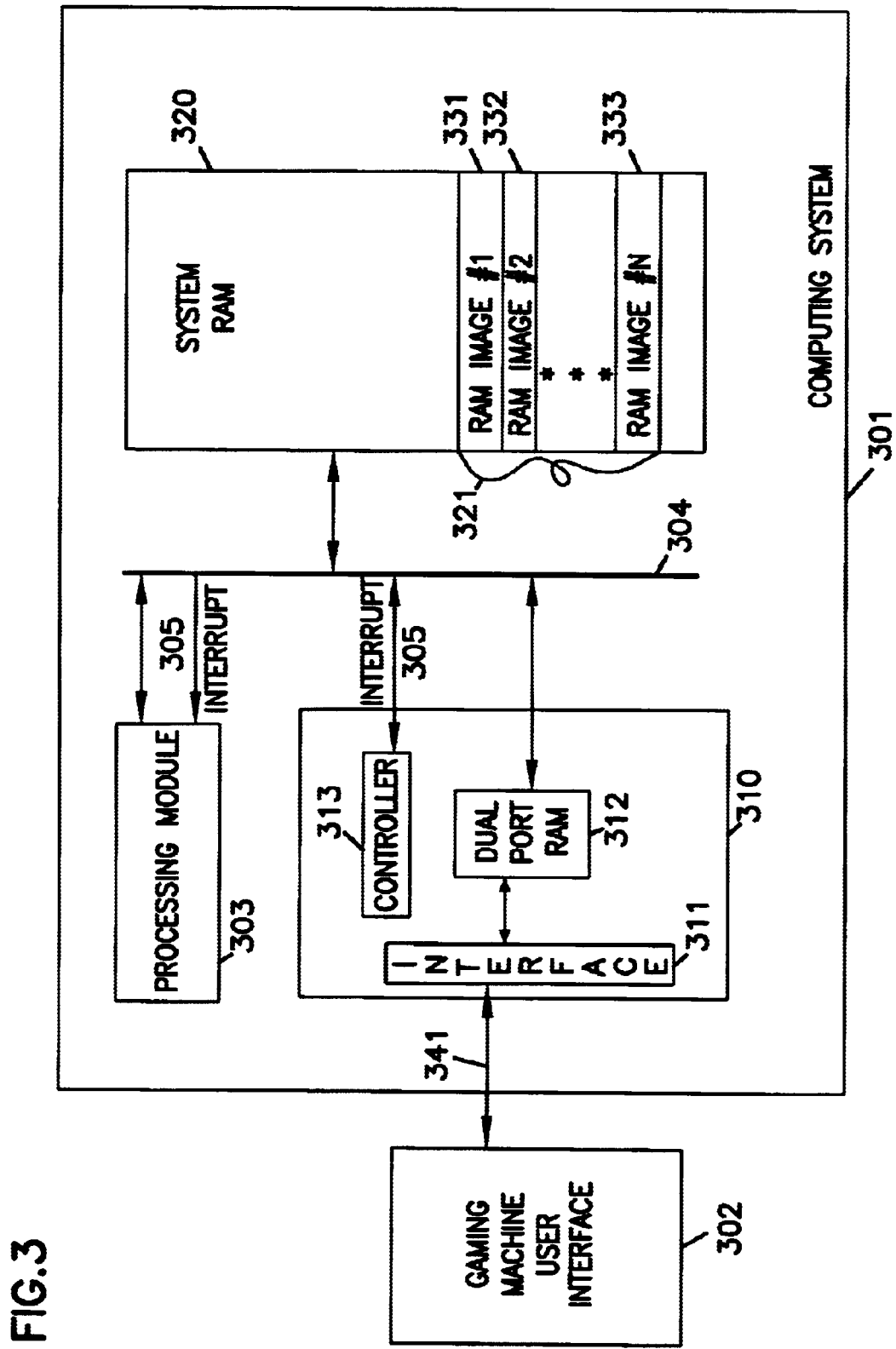
FIG. 3 illustrates computing system used to implement a gaming machine with an IIOB module according to one possible embodiment of the present invention.

FIG. 3 illustrates computing system used to implement a gaming machine with an IIOB module according to one possible embodiment of the present invention. A computer controlled gaming machine needs to provide a digital control interface between a set of game specific user interface modules 302 and the computing system executing the game application modules within the main processing module 303. The gaming machine user interface modules includes a hopper to return winnings to a player, a coin, bill, and credit card input module to accept funds for wager on the game outcome, a set of user inputs, and one or more display devices to interact with a player. The gaming machine needs to respond to a change in the state of any of these interface signals 341 between the game machine user interface modules 302 and application modules executing within the main processing module 303 as quickly as possible.

To ensure the quickest possible response to a change in state of one of the interface signals 341, an intelligent IO interface module (IIOB) 310 is used to quickly capture the change in state of the signal and transmit this information to the gaming application modules in the main processing module 303. The IIOB module 310 has a programmable controller 313 which performs the necessary operations to sense the change in state of the interface signals 341, to debounce the interface signals 341 n order to detect only one state change in response to an external act of a game player, and to generate the necessary interrupt signal 305 to the main processing module 303 that a change in the state of the interface signals has occurred. The IIOB module also has a dual port memory block 312 to provide the interface between the IIOB module 310 and the main processing module 303 and an external interface module 311 to provide an electrical interface between the IIOB module 310 and the gaming machine user interface modules 302.

In the preferred embodiment, the gaming application modules have been developed using a platform independent programming environment in order to support both a rapid and efficient gaming application module development process and a support game application execution within a distributed processing environment. To satisfy these system requirements, the gaming application modules are developed as Java classes within a framework of a Java application or applet using the JAVA programming language developed and licensed by SUN MICROSYSTEMS, of Mountain View, Calif.

Java applications and applets are semi-compiled byte-code programming modules that are interpreted by a Java Virtual Machine (JVM). The JVM is itself an application programming module that executes within the main processing module 303. The JVM loads the byte-code representation of the Java application or applet into its data memory, parses the code, and interprets the various operations.

Figure 8:
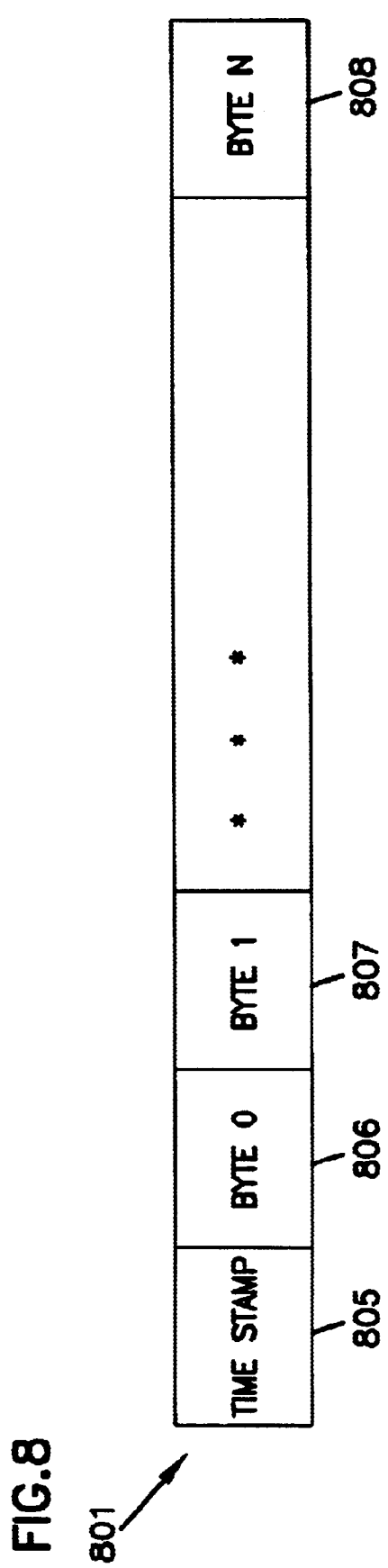
FIG. 8 illustrates a IIOB input queue data packet according to one possible embodiment of the present invention.

The IIOB module 310 overcomes this limitation within Java programming environment through the use of the programmable control processor 313. The control processor 313 generates an IIOB State packet 801 that represents the current state of the interface signals 341 and provides them to the main processing module 303 through an IIOB queue 321. The IIOB state packet 801 format is illustrates in FIG. 8 and possesses a time stamp field 805 and a plurality of data bytes 806–808. Each bit within the data bytes represents the current state of the interface signals 341.

In the preferred embodiment, the time stamp field is actually filled by the gaming application module when the IIOB state packet is read from the IIOB input queue 321. This operational procedure was made to simplify the design of the IIOB module 310 as it does not require access an accurate time clock. This operational procedure also reduces processing overhead for the interrupt service routine as it also does not need to obtain access to a time clock. The gaming application modules are not time sensitive and may accept some uncertainty as to the exact time the external interface signal 341 changed state while continuing to function correctly. In alternate embodiments in which the application requires a more accurate indication of exactly when the external interface signal changed state, the time stamp field 805 may be filled by either the IIOB module 310 or the interrupt service routine without deviating from the spirit and scope of the present invention.

The operation of the IIOB module 310 will ensure that an IIOB data packet 801 is generated for each state change on every interface signal 341 during the operation of the gaming machine. When more than one interface signal state change occurs before the gaming application has time to receive and process the prior state change, a plurality of IIOB state packets 331–333 are generated and stored in the IIOB input queue 321. The plurality of IIOB state packets 331–333 are processed in the order in which the state changes occur. As a result, the operation of the gaming machine will correctly occur even though the Java based gaming applications may be incapable of receiving and processing these signal state changes in a real-time manner. Because the IIOB state packets 331–333 possess a representation for every external interface signal 341, the gaming application modules may determine the exact occurrence of all signal state changes as they occur during the operation of the game.

Figure 4:
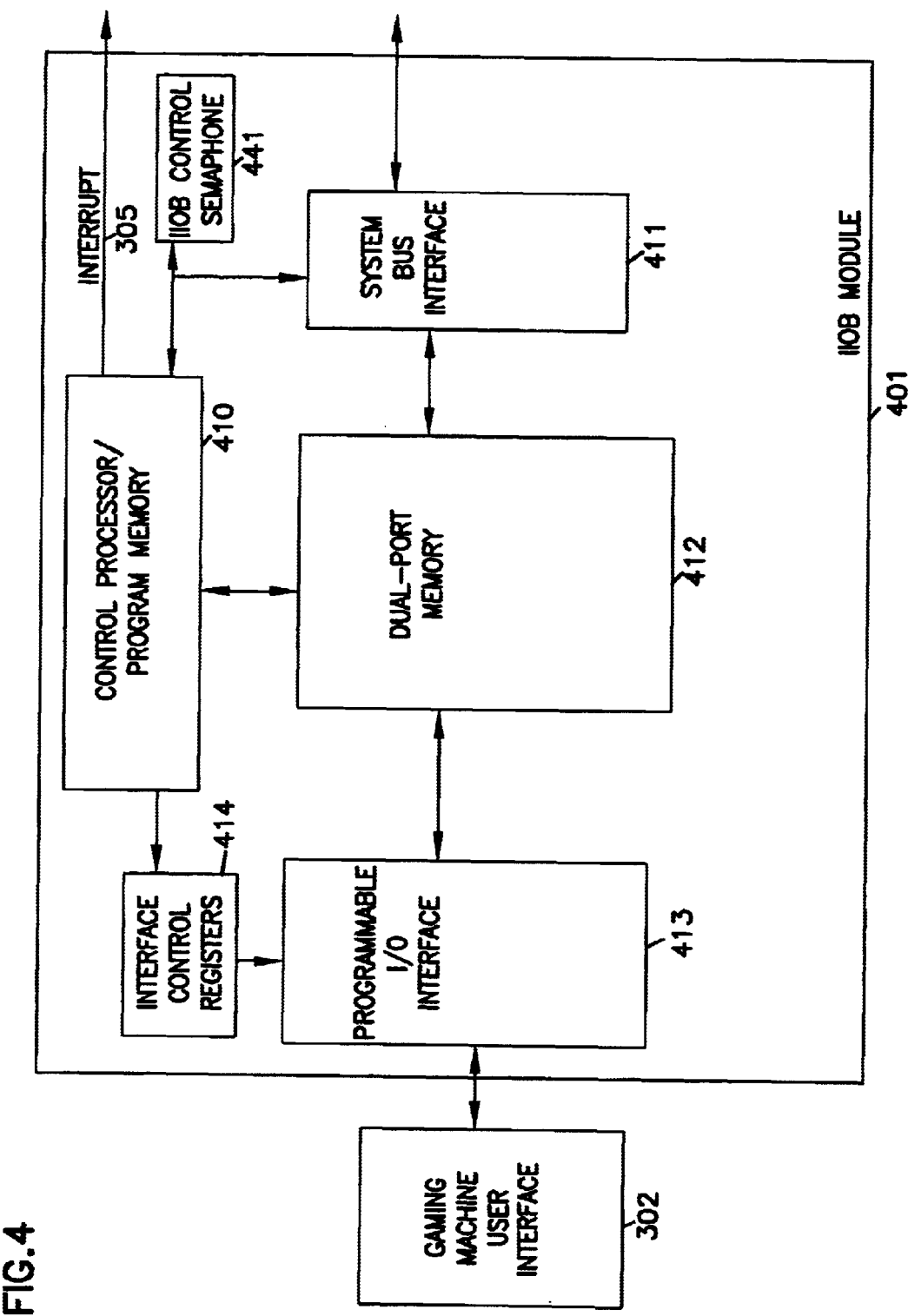
FIG. 4 illustrates in detail an IIOB module in detail according to yet another embodiment of the present invention.

FIG. 4 illustrates in detail an IIOB module in detail according to yet another embodiment of the present invention. The IIOB module 401 includes a set of programmable input and output interface logic 413 to electrically interconnect a plurality of gaming machine user interface modules 302 to the IIOB module 401. The programmable I/O interface 413 is constructed from a set of logic which allows all of the interface signals 341 to be defined as either input or output signals. The operation of each interface signal 341 is defined by the contents of a set of interface control registers 414 that are loaded from the main processing module 303 before the game begins. This interface logic is constructed using IZC protocols, a well-defined industry standard.

The IIOB module 401 also includes a dual-ported memory block 412 coupled on one port to the system interface to permit the main processing module 303 to read and write data to and from the IIOB module 401. The other port on the dual-ported memory block 412 is coupled to the control processor 410 and the programmable I/O interface 413. The IIOB control processor 410 is an Intel 8051 single chip microcontroller in the preferred embodiment. Of course, any programmable control processor may be used in the IIOB module without deviating from the spirit and scope of the present invention. The control processor 410 receives commands from the main processing module 303 in the form of command packets that are written into the dual-ported RAM block 412 through the system bus interface 411. The control processor 410 will read, decode, and process these commands to configure and perform the IIOB module operations.

The control processor 410 configures the operation of the programmable I/O interface 413 by accepting a configuration data packet from the main processing module 303 through the dual-ported RAM block 412. The control processor 410 will read the configuration data packet from the RAM block 412 and load the appropriate values into the interface control registers 414. This operation occurs before the control processor 410 begins monitoring the interface signals 341 for state changes.

During the operation of a gaming application module within the main processing module 303, the IIOB control processor 410 monitors the state of interface signals 341. When the control processor detects a state change in one or more of these interface signals, the control processor performs a sequence of operations. First, the control processor gains control over the IIOB control semaphore 441. The semaphore 441 is used by both the control processor and the main processing module 303 to gain exclusive control over the IIOB module 401. Once the control processor 410 has control over the IIOB module 401, the control processor stuffs the current state of the interface signals 341 into the appropriate bits within the IIOB data packet 801. The IIOB data packet is written into the dual-ported RAM block 412 to permit access by the main processing module 303. Once the IIOB data packet 801 is stored in the RAM block 412, the control processor 410 releases the IIOB control semaphore 441 and asserts an IIOB interrupt signal 305.

The IIOB interrupt signal 305 immediately causes an interrupt service routine to begin executing within the main processing module 303. The interrupt service routine will take the IIOB control semaphore, then copy the IIOB data packet 801 from the IIOB dual-port RAM block 412 into the IIOB input queue 321, release the IIOB control semaphore, and then transmit an interrupt acknowledgment signal to permit the control processor 410 to write subsequent data state packets to the dual-port RAM 412.

When the main processing module 303 wishes to change the state of an output interface signal 341, the main processing module 303 transmits a command data packet to the IIOB control processor 410 through the RAM block 412. The command packet will specify the interface signal to be altered, the length of any pulse being transmitted on the interface signals, and any other command data needed to specify the signal state change. Once the command is stored in the RAM block 412, the control processor will read and decode the command packet. The control processor 410 will cause the interface signal 341 to change as specified in the command packet. The definitions of these commands and interface signals are defined in the IIOB command and signal definition sections recited below.

Figure 5:
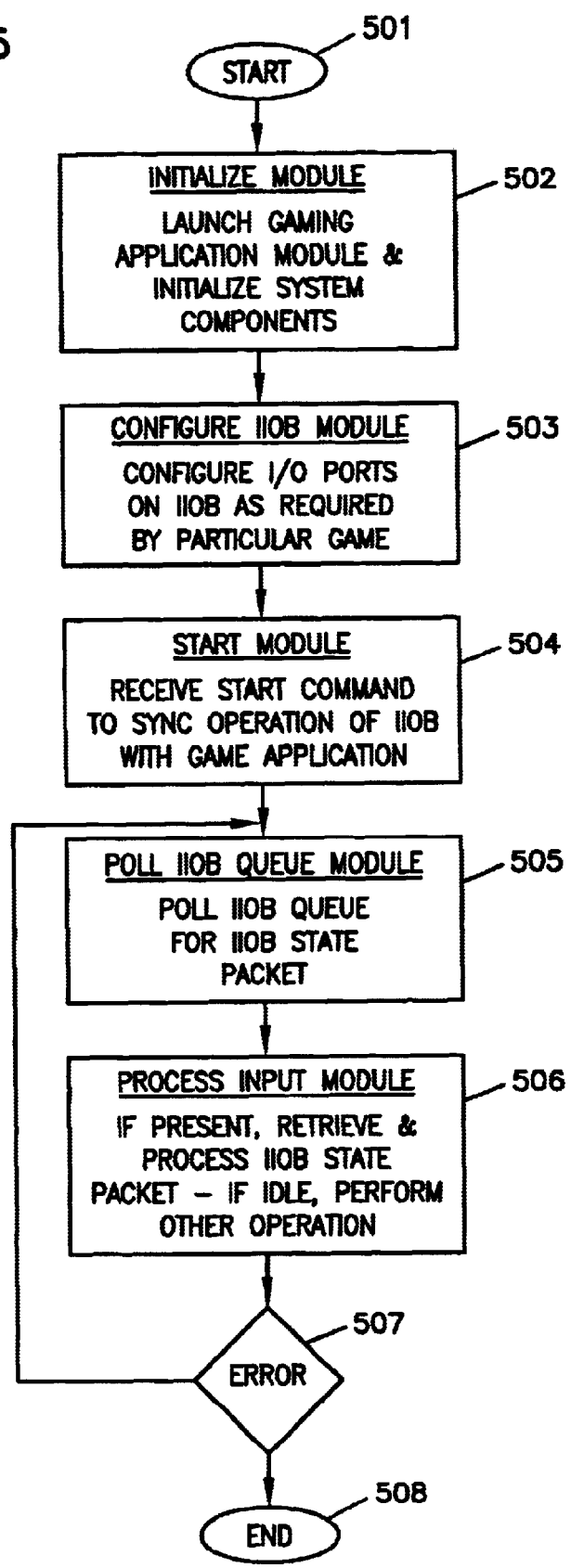
FIG. 5 illustrates an operational flow diagram for a gaming application module utilizing an IIOB module according to another embodiment of the present invention.

FIG. 5 illustrates an operational flow diagram for a gaming application module utilizing an IIOB module according to another embodiment of the present invention. The gaming applications modules begin by executing an initialize module 502 in which a gaming application module is launched and its respective components are initialized. Next, a Configure IIOB module 503 is performed to configure the programmable I/O interface 413 on the IIOB module 401. As discussed above, a configuration data file is written into the RAM block 412 in the IIOB module 401 for use by the control processor 410 to load the interface control registers 414.

Once all of the system components are configured, a Start Module 504 is executed to synchronize the start of the operation of the IIOB interface signal monitoring with the beginning of the operation of the gaming application module. The Start module 504 transmits a signature check packet to the IIOB module 401, to verify the contents of the IIOB's program ROM, part of the Control processor/Program Memory 410. The Start module then compares the signature to one calculated by the Start module from an image of the correct IIOB program stored on the Mass Storage Device 211. If the signature is correctly verified, the Start module transmits a start command packet to the IIOB module 401 to inform the control processor 410 that the game application processing has begun.

The gaming application modules now enter a main processing loop defined by a Poll IIOB Queue module 505, Process Input module 506, and Fatal Error test operation 507. In the Poll IIOB Queue module 505, the main processing module checks the IIOB input queue 321 to the presence of an IIOB state data packet 801. If a data packet 801 is present, the Process Input module 506 retrieves the IIOB state data packet 801 and performs the appropriate operation based upon the nature of the external interface signals 341 state change represented in the IIOB state data packet 801. As stated above, the Process Input module 506 will fill the time stamp field 805 in the IIOB state data packet 801 as part of its operation.

If no IIOB state data packet 801 is found in the IIOB input queue 321, the Process Input module will be in an idle state and be able to perform other operations. For example, between various plays of a video slot machine, a significant amount of idle time may occur as players pause in their playing. During these periods of time, the gaming application modules may wish to display advertisements and other messages not directly related to the playing of a slot game. These advertisements may attempt to either induce players to wish to play the game or induce players to patronize other parts of the gaming establishment in which the gaming machine is located. The Fatal error test operation 507 provides a logical manner to halt the operation of the gaming application module based upon an occurrence of various external interface signals 341.

Figure 6:
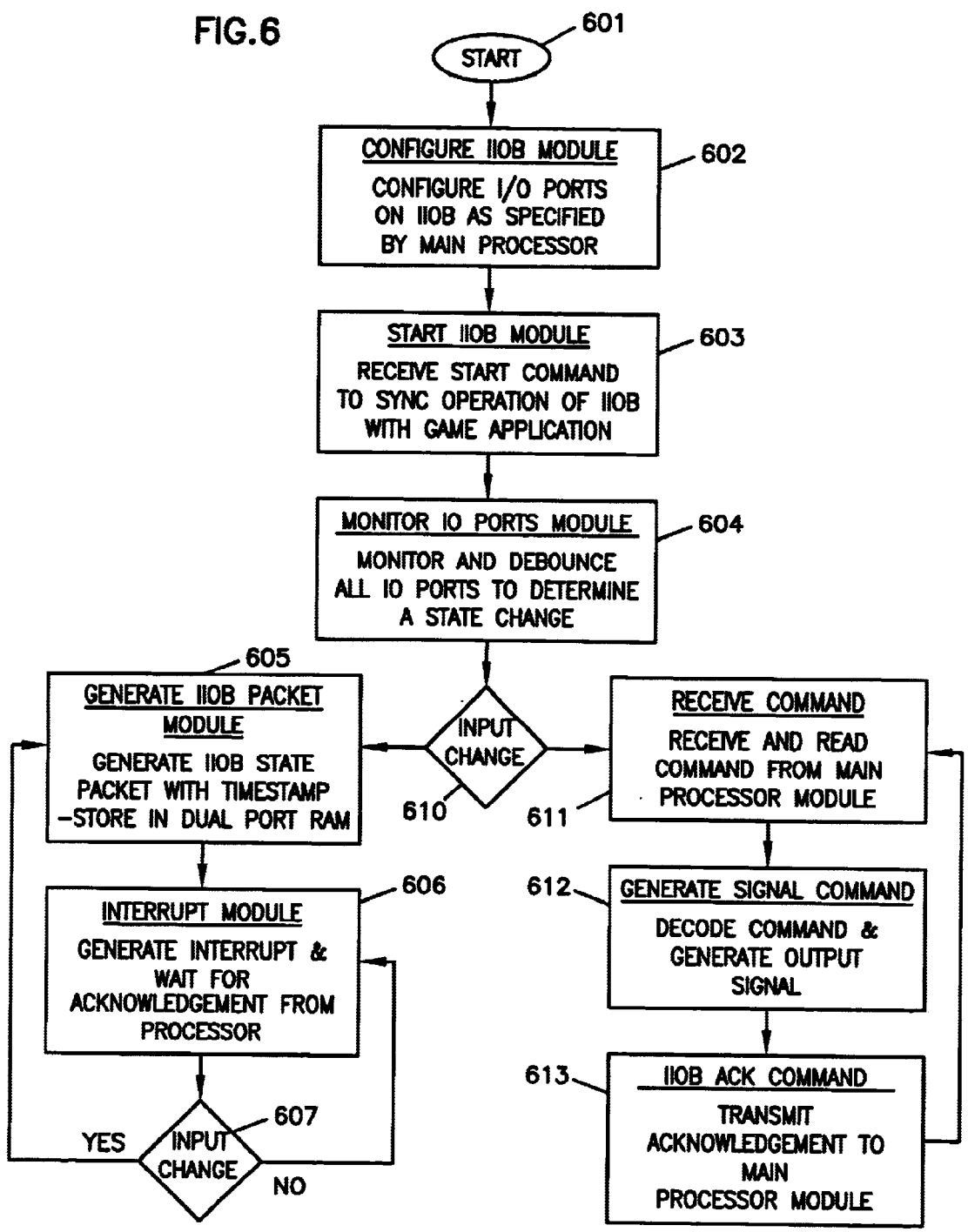
FIG. 6 illustrates an operational flow diagram for a control processor within an IIOB module according to yet another possible embodiment of the present invention.

FIG. 6 illustrates an operational flow diagram for a control processor within an IIOB module according to yet another possible embodiment of the present invention. The IIOB module 401 begins its operation by executing a Configure IIOB module 602. In the Configure IIOB module 602, the IIOB control processor 410 receives a configuration data packet to configure the operation of the programmable I/O interface 413 as discussed above at length. Once configured, the IIOB module waits to receive a start command packet from the main processing module 303. This start command packet causes the Start IIOB module 603 to execute to synchronize the operation of the IIOB control processor 410 with the operation of the gaming application module.

The IIOB module 401 next executes the Monitor 10 Ports module 604. In this module 604, the control processor 410 is monitor the external interface signals 341 for a change in state. The control processor is also monitoring the system bus interface 411 for receipt of an output signal command from the main processing module 303. Upon the occurrence of either of these events, the control processor 410 determines which operation is to be performed in a Input Change test operation 610.

If an input signal change has occurred, the control processor 410 performs the Generate IIOB Packet module 605 to generate the IIOB state data packet 801 and store it within the IIOB dual ported RAM block 412. The Control processor next generates an IIOB interrupt signal 305 in the Interrupt module 606 and awaits and acknowledgement signal. The control processor will remain waiting for the acknowledgement signal in operation 607 before returning to the Monitor IO Ports module 604.

When an output signal command is received from the main processing module 303, the Input Change test operation will fail. The action will cause the Receive Command module 611 to be performed. The IIOB control processor will receive, read, and decode the command received from the gaming application module. Once decode, the control processor 410 generates an appropriate change in an output signal in a Generate Signal Command module 612. The control processor 410 will next execute an IIOB Ack Command module 613 to signal the main processing module 303 that the output signal has been generated. The control processor now returns to the Monitor IO Ports module 604 to await the next signal event.

Figure 7:
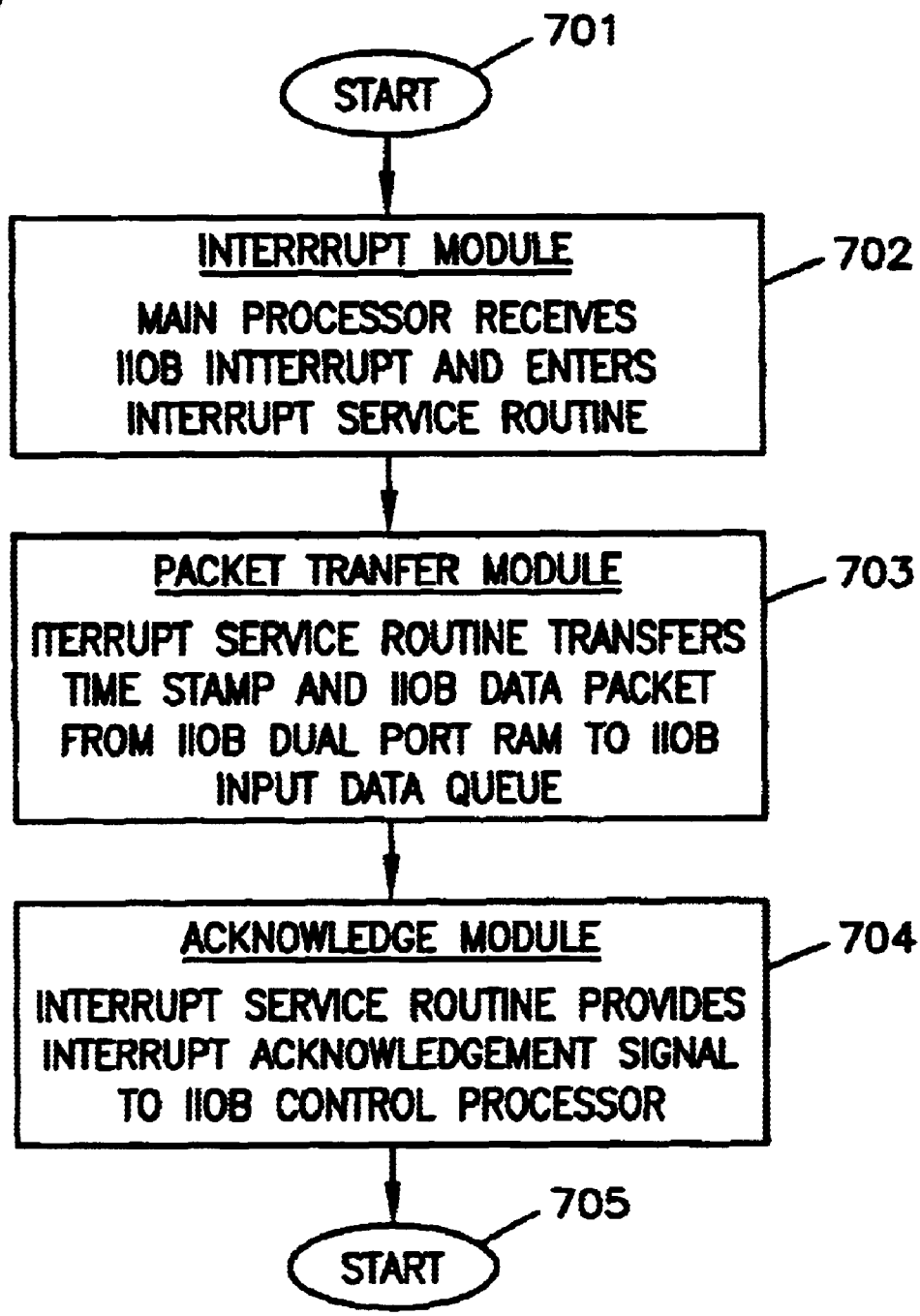
FIG. 7 illustrates an operational flow diagram for an interrupt service module for responding to an interrupt generated by an IIOB module according to yet another possible embodiment of the present invention.

FIG. 7 illustrates an operational flow diagram for an interrupt service module for responding to an interrupt generated by an IIOB module according to yet another possible embodiment of the present invention. The IIOB interrupt signal 305 immediately causes an interrupt service routine to begin executing within the main processing module 303 in the interrupt module 702. The interrupt service routine will copy the IIOB data packet 801 from the IIOB dual-ported Ram block 412 into the IIOB input queue 321 in a packet transfer module 703 and then transmit and interrupt acknowledgement signal to permit the control processor 410 to continue to monitor the interface signals 341 in an acknowledgement module 704.

In a preferred embodiment, the IIOB is configured to support a wide variety of gaming machines as discussed below. The I/O board remains active during alarm conditions, except at shutdown or when the alarm is caused by a failure of the IIOB. If the IIOB fails to respond correctly to regular system polls at any time, a reset operation is performed and an alarm declared. If the IIOB to respond to the reset, the alarm may only be cleared by re-booting; such a failure most likely indicates a hardware defect.

The protocol for communication between player/dealer station motherboards (with associated system software) and the IIOB is accomplished via data transfers within one of 7 segments of dual-port RAM on the IIOB, visible to the ISA bus on the motherboard. Total RAM is 4 KB. The IIOB issues a programmable interrupt (IRQ 6, 7 or 9) whenever it has completed a write operation. In the current implementation, a PAL is used to fix the interrupt at IRQ 7. Dual-port memory begins at ISA address 0xb0000 and extends to 0xb0fff. This is followed by 8 bytes for semaphores at 0xb1000 through 0xb1007. A hardware reset byte is located at 0xb1010.

At power-up, or other hardware reset, the processor on the IIOB will attempt to lock semaphore 0. Regardless of whether it is successful, the IIOB will write the string "IIOB" into the first four bytes of dual-port memory and attempt to release semaphore 0. The host will then attempt to lock semaphore 0. If semaphore 0 cannot be locked by the host, a reset will be issued by writing 0x01 to byte 0xb1010 on the board and the sequence will begin again. After the host has locked semaphore 0, all bytes will be cleared and the string "HOST" will be written to the first four bytes of dual-port memory. The IIOB then waits for the configuration command, followed by a start command (see Commands, below). The host must wait a minimum of 10 ms before attempting to lock semaphore 0 after a power-up or other hardware reset. When the host issues a hardware reset, the reset must be cleared by writing 0x00 to byte 0xb1010 before the IIOB processor can act.

Semaphore 0 controls all access to dual-port memory. No ISA memory location from 0xb0000 through 0xb1000 should be read or written by the host or the IIOB processor unless semaphore 0 is locked by that party.

There are 4 segments (0–3) of 512 bytes each for Serial I/O. Each of the segments 0–3 is associated with a specific serial port. If byte 0 of any serial port segment is set to anything other than 0, a serious tilt has occurred and the host will shutdown and reset the IIOB.

Bits are set in byte 0 of memory segment 4 (see Input Register, below) whenever the IIOB transfers data. Bits are set in byte 0 of memory segment 5 (see Output Register, below) whenever the host transfers data. Note that the IIOB may not be able to accept all host data at once, particularly serial transfers and so will not necessarily clear all flag bits set by the host.

The fifth segment (4) of 12 bytes is associated with parallel input from the IIOB (Input Registers). Byte 0 is a status byte indicating which of the seven segments of RAM have been updated by the IIOB since the last interrupt (bit 0 represents serial port 0, and so on, with bit 6 representing segment 6 (Command Register, below). Byte 1 indicates which areas within segment 4 have been updated by the IIOB since the previous interrupt; bytes 0–1 are cleared by the system when they have been read. Byte 2 contains separate status bits, representing hopper empty, hopper jammed, hopper tilt, and fatal conditions for AC power-down detected, incorrect signature received, and I2C bus error Byte 3 represents horizontal movement of the trackball, with the high-order bit (Hex 80) representing leftward movement. Byte 4 represents vertical movement of the trackball, with the high-order bit (Hex 80) representing downward movement. Byte 5 indicates which of six 8-bit input ports contain changed data. Bytes 6–11 represent the 48 input lines from the IIOB. When an interrupt is received by the system, semaphore 0 is set by the system, bytes 0–1 are copied by the system and all bits in bytes 0–1 are cleared. The interrupt remains masked until all changed data has been transferred. The IIOB should not change data in any segment (or subsection) whose bit was high in bytes 0–1 until the interrupt is reset by writing Hex 00 to the hardware reset byte (0xb1010) on the IIOB. The IIOB must successfully lock semaphore 0 and set bits high for the next transfer, before issuing another interrupt. The system never sets bits in Byte 0 of segment 4; it only clears them. The system will also clear bits representing pulse lines, after transferring the data.

The sixth segment (5) of 66 bytes is associated with parallel output from the system (Output Registers). Some areas within this segment may be modified by the IIOB, as well. Byte 0 indicates any of the seven memory segments (e.g.: serial output, Command Register) that have been updated by the system. Byte 1 indicates areas within segment 5 that have been modified by the system; bits in these bytes are cleared by the IIOB when the data has been processed. Byte 2 is set high to order the IIOB to dispense a coin; this byte is to be cleared by the IIOB; an interrupt is issued by the IIOB when this byte goes to 0 (coin dispensed). Byte 3 controls the attributes of the seven-segment LED display (steady or flashing); bytes 4–11 indicate which character (see Codes, below) is to be displayed in each of 8 individual cells. Bytes 12–15 contain one bit each for the 32 output line status bytes (the byte assigned to the hopper motor is ignored by the system); these are set by the system and cleared by the IIOB; no interrupt is issued by the IIOB when such a flag is cleared. Bytes 18–49 are status bytes for the individual lines, to allow for multiple states (e.g.: a lamp line may be on, off or blinking—see Codes, below). Bytes corresponding to pulse lines (e.g.: hard meter lines) are cleared by the IIOB after the pulse has been sent and the inter-pulse interval has begun and an interrupt is issued (as for the coin dispensed byte). Bytes 50–65 are reserved. The IIOB does not set any bits in bytes 4–11 of segment 5 when a pulse line or byte 2 is cleared; however it should set bit 5 in byte 0 of segment 4.

The seventh segment (6) of 512 bytes is used by the system for writing configuration and control packets to the IIOB (Command Register). If the corresponding bit is set in segment 5, the packet in segment 6 should always be processed first (it may be a shutdown or reset command).

Dual Port Memory Map

Serial Port 0

Byte 0: Serial port 0 status byte from UART (tilt if not 0)

Byte 1: reserved

Bytes 2–3: Data byte count (Intel byte order: byte 0 is least significant byte)

Bytes 4–511: Data

Serial Port 1

Byte 512: Serial port 1 status

Byte 513: reserved

Bytes 514–515: Data byte count (Intel byte order: byte 0 is least significant byte)

Bytes 516–1023: Data

Serial Port 2

Byte 1024: Serial port 2 status

Byte 1025: reserved

Bytes 1026–1027: Data byte count (Intel byte order: byte 0 is least significant byte)

Bytes 1027–1535: Data

Serial Port 3

Byte 1536: Serial port 3 status

Byte 1537: reserved

Bytes 1538–1539: Data byte count (Intel byte order: byte 0 is least significant byte)

Bytes 1540–2047: Data

Parallel Inputs

Byte 2048: IIOB segment status
  Bit 0: segment 0 changed
  Bit 1: segment 1 changed
  Bit 2: segment 2 changed
  Bit 3: segment 3 changed
  Bit 4: segment 4 changed
  Bit 5: segment 6 changed
  Bit 6: segment 6 changed Byte 2049: Segment 4 status
  Bit 0: IIOB status changed
  Bit 1: trackball delta changed
  Bit 2: input lines changed Byte 2050: IIOB status
  Bit 0: fatal error (reset please)
  Bit 7: hopper timeout
  Bit 6: coin-out sensor on too long (jam or fishing)
  Bit 5: coin-out sensor went on with hopper motor off Byte 2051–2052: Trackball delta Byte 2053: Input port status (note: hopper sensor is ignored by the system)
  Bit 0: port 0 changed
  Bit 1: port 1 changed
  Bit 2: port 2 changed
  Bit 3: port 3 changed
  Bit 4: port 4 changed
  Bit 5: port 5 changed Byte 2054–2059: Input lines (note: hopper sensor is ignored by the system)

Parallel Outputs

Byte 2060: System segment status
  Bit 0: segment 0 changed
  Bit 1: segment 1 changed
  Bit 2: segment 2 changed
  Bit 3: segment 3 changed
  Bit 4: segment 4 changed
  Bit 5: segment 5 changed
  Bit 6: segment 6 changed Byte 2061: Segment 5 status
  Bit 0: dispense coin
  Bit 1: seven-segment displays
  Bit 2: output port lines Byte 2062: Dispense coin
  Bit 7: reset hopper
  Bits 0–6: number of coins to dispense (currently 1 at a time)

Bytes 2063–2071: Seven-segment display attributes and characters

Byte 2072–2075: Output line status (note: hopper motor is ignored by the system)
  Bit 0: line 0 changed
  Bit 1: line 1 changed
  Bit 31: line 31 changed Byte 2076–2077: reserved Byte 2078–2109: Output lines (see Codes, below)

Byte 2110–2125: reserved

Commands

Byte 2126: Command type (see Commands, below)

Byte 2127: reserved

Bytes 2128–2129: Command byte count (Intel byte order: byte 0 is least significant byte)

Bytes 2130–2637: Command data

Bytes 2638–4095: reserved

Bytes 4096–4103: Semaphores

Bytes 4104–4111: reserved

Byte 4112: Hardware reset (see Codes, below)

Framing

Each serial packet consists of a one-byte status code, followed by a reserved byte, followed by a 16-bit (Intel format), unsigned integer for length of the data to follow. This is followed by the data. Printer data should be passed to the printer port as it is received by the IIOB. Note that Online Accounting System protocols will be handled off the IIOB.Command packets consist of a command type, followed by a reserved byte, followed by a 16-bit (Intel format), unsigned integer for length of the data to follow. This is followed by the command. The framing conventions apply only to segments 0–3 and 6 of memory. Other traffic is controlled by the segment status bits in segments 4 and 5.

Codes

Codes are all one-byte integers, specifying the device to receive the message within a frame. Additional codes are provided for the IIOB itself, lamp switches (to indicate blinking or steady) and LED displays to indicate data and display characteristics.

| Device | Code | Meaning |
|---|---|---|
| Device Codes | | |
| Input/Output line | Hex ff | Unused line |
| Input/Output line | Hex 00 | Any line but hopper lines |
| | Hex 80 | blink |
| | Hex 00 | off |
| | Hex 01 | on |
| | Hex 02 | Send pulse |
| Hopper sensor line (input) | Hex 01 | |
| Hopper motor line (output) | Hex 02 | |
| Check Signature | Hex 03 | Command (from system) |
| LED | | |
| | Hex 80 | blink (attribute) |
| | Hex 01–0f | intensity (attribute) |
| | Hex 80 | (period for any digit byte) |
| | Hex 00–09 | digit |
| | Hex 0a | - (dash) |
| | Hex 0b | E (ee) |
| | Hex 0c | H (aitch) |
| | Hex 0d | L (ell) |
| | Hex 0e | P (pee) |
| | Hex 0f | blank |
| Shutdown | Hex 00 | Command (from system) |
| Configure | Hex 01 | Command (from system) |
| Start | Hex 02 | Command (from system) |
| Hardware reset byte | | |
| | Hex 00 | Reset interrupt |
| | Hex 01 | Reset IIOB |

Commands

For all commands, the expected nominal return code (ACK) is the same as the command. All commands must be ACKed; the IIOB should set the required segment 4 flag and interrupt after sending a response. Error responses (NACK) use the same code as the command, but with the high-order (Hex 80) bit set. If a command is outstanding for over 100 ms, the system will attempt a hardware reset of the board.

Shutdown

Orderly shutdown request from system (not NMI power-fail). The main difference between this and an emergency power-fail shutdown is that the system issues it. The IIOB should finish dispensing any coin in progress and flush serial outputs.

| Byte 0: | Hex 00 | (Shutdown) |
|---|---|---|
| Byte 2–3: | 0 | |
| ACK is an echo; NACK is Hex 80 in byte 0. | | |

Start

Begin normal processing. This must be given to the IIOB before any command other than Configure is sent to the IIOB, or any data is sent.

| Byte 0: | Hex 02 | (Start) |
|---|---|---|
| Byte 2–3: | 0 | |
| ACK is an echo; NACK is Hex 82 in byte 0. | | |

Configuration

Configuration should be the first command received, after a power-up, Shutdown or Reset. Any other packet sent to the IIOB should receive only a NACK Configuration (see Codes, above) in reply with no further action by the IIOB. The structure of a configuration packet follows:

| Byte 0: | Hex 01 | (Configuration) |
|---|---|---|
| Bytes 1–144: | Input lines | (3 bytes each) |
| Bytes 145–288: | Output lines | (3 bytes each) |
| Byte 289: | Trackball | |
| Byte 290: | Seven-segment display | |
| Bytes 291–317: | Serial ports | |
| ACK is an echo; NACK is Hex 81 in byte 0 | | |
| Unused Input/Output line | | |
| Byte 0: | Hex ff | |
| Byte 1: | reserved | |
| Byte 2: | reserved | |

For all Input/Output lines (other than unused ones), a 0 (zero) in Byte 1 indicates a switch (on/off) line, with Byte 2 indicating a time gap for blinking. For other lines, if the high bit in Byte 1 is 0, pulses should pull low ("normal"); if the bit 0x80 is set, pulses should be high and the line should be pulled low between pulses.

Input/Output line other than hopper lines

| Byte 0: | Hex 00 |
|---|---|
| Byte 1: | 1–127 (minimum valid pulse length in 10 ms intervals) |
| Byte 2: | 1–127 (minimum interval between repeats in 10 ms intervals) |

Hopper sensor line for parallel interface hopper pulse input)

| Byte 0: | Hex 01 |
|---|---|
| Byte 1: | 1–127 (minimum valid pulse length in 10 ms intervals) |
| Byte 2: | 1–127 (minimum interval between repeats in 10 ms intervals) |

Hopper motor line for parallel interface hopper (acts like a switch)

| Byte 0: | Hex 02 |
|---|---|
| Byte 1: | 0 |
| Byte 2: | reserved |

Trackball

Byte 0: timeout in 10 ms intervals for trackball update; 0 indicates no trackball.

LBD (seven-segment display)

Byte 0: Interval in 10 ms increments for blinking display; 0 indicates no display.

Serial Port

Byte 0: timeout for buffer send (10 ms intervals); 0 indicates port is unused.
Byte 1: buffer size (IIOB sends a data packet whenever the timeout is exceeded and the buffer is not empty, or when the buffer is full, regardless).
Byte 2: standard bps rate code for UART (see UART Bits per Second, below)
Byte 3: number of start bits (0–2); always == 1 in current implementation
Byte 4: number of stop bits (0–2); always either 1 or 2 in current implementation
Byte 5: number of data bits (5–8)
Byte 6: parity (0 == none; 1 == odd; 2 == even).
Byte 7: reserved UART Bits per Second Bits per second on each serial port (UART) are determined by an 8-bit code. The high-order bits 7-4 correspond to CSRA[7:4] on the UART; the next bit (3) corresponds to ACR[7] on the UART; the low-order 3 bits 2-0 correspond to MR0[2:0] on the UART. Note that BpS rates above 38.8 are only available in Extended Mode (MR0!=0). The specification states that MR0[2:0] MUST be equal to 0.

| CSRA[7:4] | MR0[0] = 0<br>ACR[7] = 0 | MR0[0] = 0<br>ACR[7] = 1 |
|---|---|---|
| 0000 | 50 | 75 |
| 0001 | 110 | 110 |
| 0010 | 134.5 | 134.5 |
| 0011 | 200 | 150 |
| 0100 | 300 | 300 |
| 0101 | 600 | 600 |
| 0110 | 1200 | 1200 |
| 0111 | 1050 | 2000 |
| 1000 | 2400 | 2400 |
| 1001 | 4800 | 4800 |
| 1010 | 7200 | 1800 |
| 1011 | 9600 | 9600 |
| 1100 | 38.4K | 19.2K |

Supported devices, as discussed above comprise:
1. electromechanical meters as required; these are defined by a subclass of powerpit.devices.MeterModel.
2. internal RAM-based meters as required; these are defined by a subclass of powerpit.devices.MeterModel.
3. file-based or binary, NVRAM logs for recovery and system audit.
4. generic serial printers.
5. CC-40 and CC-46 coin validators.
6. LED 4-digit displays.
7. IGCA patented trackball.
8. CVM (GPT) serial bill validators.
9. external lamps for service, change, player selection; these are defined in a subclass of powerpit.devices.Candelabra.
10. player buttons and associated indicator lamps; these are defined in a subclass of powerpit.devices.ButtonPanel.
11. generic hoppers with an optical sensor for coin-out and overflow.
12. generic switches for security alarms.
13. JCM (World Bill Validator) serial bill validators.

A wide range of Creative Labs SoundBlaster compatible boards may be supported. The ISA pnptools package is used to configure Plug-N-Play cards. If the commercial version of Open Sound System is installed, the OSS utilities are used.

On Linux, either .au (Sun audio format) or .wav (MS Windows audio format) sound files may be used with the JAudioClip implementation of the java.applet.AudioClip interface. Sun audio files may be used for testing with the JDK only, as the Java Runtime Environment does not support them.

Game-specific display devices (e.g.: stepper motors, tower video subsystem for games such as Lightning Strike Roulette) may be configured and registered with the I/O board by the game loop, rather than the station module. Registration is performed by the game loop using the GameApplet::register ( )method.

The primary duty common to all game loops is to continually call a poll( ) routine, implemented in both BaseGame and GameApplet base classes, which polls the station software for device messages including alarms and in the case of a multi-player game for network messages from the remote partners. Whenever poll( ) is called, it should be followed by a call to nextMessage( ), which retrieves the polled data in a standard system message packet, derived from powerpit.messages.Message.

In the case of an audit check event, the meters must be cleared by entering audit mode, and opening the logic cage; this causes a RAM_CLEAR event to be logged. An audit check event occurs whenever credit is not equal to the sum of cash-in plus cumulative win minus cash-out, minus cumulative bet, minus current bet. Current bet is added to cumulative bet at the end of each game; the audit check is performed at the beginning of the game and each time a bet is placed.

RAM corruption or any change in the configuration causes a RAM/Version check event to occur. In the case of a single player game (e.g.: Storybook Fantasy), or player station for a multi-player game (e.g.: BJ Blitz Blackjack) the event is cleared as with the audit check event above. For the dealer station in a multi-player game, the alarm is cleared by opening the logic door.

An audit-check tilt may only be cleared by turning the attendant key to its "on" position and opening the logic door to clear the meters; a ram-clear event is logged at this time. On multi-player dealer stations, the attendant key is not required; opening the logic cage clears RAM and restores game function.

A hopper, bill validator or IO board tilt of any kind stops the game as with an open door. These tilts may only be cleared by opening at least one door and then closing all doors.

Any door open results in a tilt as well as hand-pay-required or a failed audit check. In multi-player games, a dealer tilt will disable all player stations as well. A power-down alarm results in the shutdown of the station that declared it. In multi-player games, a dealer power-down will result in a shutdown by the player stations as well.

On graphical player stations, if no hand-pay alarm is in force, turning the attendant key to the "on" position causes the station to be disabled as for an alarm. Pressing the cashout key cycles from one data set to the next; pressing the attendant key pages through the current data. Opening the logic door clears the current log and in the case of clearing the meters enters a "Ram cleared" alarm in the event log. Clearing the meters in audit mode is the only way for game play to proceed after an audit check alarm is raised. Data is displayed or cleared by powerpit.mains.audit.Audit; an instance of this class is owned by the game applet on player stations (only). Audit is invoked by GameApplet::audit( ).

RAM based meters are updated immediately as credits are transferred, and the resulting values are logged. Electromechanical meters are updated asynchronously, until all deltas have been added; the "unrolled" amount is logged each time the meter is incremented for power-fail recovery.

In the case of game-play, credits are transferred to an interim bet meter rather than directly to the cumulative bet (Nevada coin-in) meter. At the end of the game cycle, these credits are returned to the credit meter in the event of a tilt, or then added to the cumulative bet meter. At this time, credits paid by the game are also added to the cumulative won meter. At shutdown, the game invokes the destroy( ) method. This causes a flag to be set, indicating that shutdown is in progress, and launches a Thread that is an instance of powerpit.mains.Stopper to complete shutdown processing. This Thread stops the running game loop and issues a shutdown command to the local station. If this is a dealer station, the shutdown command is relayed to the remote player stations.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing real-time external signals to a platform independent programming environment executing upon a computing system, the computing system having an input packet queue, a main processing module, and an intelligent I/O interface module, and the intelligent I/O interface module having a control processor, a plurality of external signal interfaces, and a dual-port RAM, the method comprising:

detecting a change in state of at least one of the external signals by the control processor;

generating an interface state packet containing representations of a current state of all external interface signals;

storing the interface state packet within the dual-port RAM;

asserting an interrupt signal from the control processor to the main processing module to indicate a presence of the interface state packet within the dual-port RAM; and receiving an acknowledgement signal asserted by the main processing module to indicate that the main processing module has transferred the interface state packet from the dual-port RAM to the input packet queue.

2. The method according to claim 1, wherein the interface state packet comprises a time stamp field and a plurality of data bits organized into bytes, each of the data bits represent the present state of each external interface signal.

3. The method according to claim 1, wherein the external signal interfaces are programmable to permit each interface signal to behave as an input signal and an output signal.

4. The method according to claim 3, wherein the method further comprises:

receiving a configuration command by the control processor through the dual-port RAM to specify an operation of the programmable external signal interfaces; and receiving a start command by the control processor through the dual-port RAM to synchronize the operation of the control processor with a corresponding operation of main processing module.

5. The method according to claim 1, wherein the platform independent programming environment is a JAVA-based programming environment executing on an LINUX-based computing system.

6. A computer-readable medium having computer-executable instructions for the method recited in claim 1.

7. A computer data signal embodied in a carrier wave readable by a computing system and encoding a computer program of instructions for executing a computer process performing the method recited in claim 1.

* * * * *